United States Patent [19]

Kresge et al.

[11] 4,174,530

[45] Nov. 13, 1979

[54] VOLTAGE SURGE ARRESTER DEVICE

[75] Inventors: James S. Kresge, Pittsfield; Eugene C. Sakshaug, Lanesborough, both of Mass.

[73] Assignee: General Electric Company

[21] Appl. No.: 870,869

[22] Filed: Jan. 20, 1978

[51] Int. Cl.[2] .................... H02H 3/22

[52] U.S. Cl. .................... 361/127; 361/120; 315/36

[58] Field of Search .................... 361/127, 126, 128, 115, 361/118, 130, 120; 315/35, 36; 338/21, 20

[56] References Cited

U.S. PATENT DOCUMENTS

| | | | |
|---|---|---|---|
| 3,320,482 | 5/1967 | Sakshaug et al. | 361/128 X |
| 3,515,934 | 6/1970 | Kershaw, Jr. | 361/128 X |
| 3,518,492 | 6/1970 | Kresge et al. | 36/128 |
| 3,733,520 | 5/1973 | Schei | 361/130 |

FOREIGN PATENT DOCUMENTS

| | | | |
|---|---|---|---|
| 1003485 | 11/1977 | Canada | 361/127 |
| 7209436 | 8/1972 | Sweden . | |
| 594298 | 1/1978 | Switzerland | 315/35 |
| 1258126 | 5/1970 | U.S.S.R. | 315/35 |

*Primary Examiner*—Patrick R. Salce

*Attorney, Agent, or Firm*—Francis X. Doyle; Richard A. Menelly

[57] ABSTRACT

Voltage surge arrester devices having predetermined shunt gap sparkover voltages are provided by the series combination of high- and low-exponent varistors. In one embodiment the high-exponent varistor comprises zinc oxide and the low-exponent varistor comprises silicon carbide.

9 Claims, 6 Drawing Figures

VOLTAGE SURGE ARRESTER DEVICE

BACKGROUND OF THE INVENTION

The advent of high-exponent zinc oxide type varistors permits voltage surge arresters containing the varistors to be designed without the need for series gaps. The term "exponent" as used herein refers to the value of the current-voltage exponent "n" of the voltage in the current-voltage relationship for a nonlinear resistor given by the expression $I=kV^n$ where I represents the current through the varistor, K represents a constant and V represents the voltage across the varistor.

Earlier varistor material, such as silicon carbide had an exponent of about 4 to 5 which was too low an exponent to allow the varistor to be continuously and directly connected from line to ground.

Thus, if the varistor impedance was chosen to limit the discharge voltage to a practical value at a current of 10,000 amperes during the discharge of lightning surge, then at normal operating voltage the current would be sufficiently high to cause overheating and finally failure by thermal runaway. For this reason series spark gaps were used with the low-exponent devices, providing an open circuit between the varistor and ground during normal operating conditions. In order for current to flow through the low-exponent varistor devices an overvoltage surge condition sufficient to spark over the series gap had to occur before the varistors could become conductive to ground.

The high-exponent zinc oxide type varistors have an exponent of about 25 or even higher over the operating range of interest. A consequence of this high an exponent is that a varistor of this material which is designed to be stable, that is, to continuously withstand normal system operating voltage will, when subjected to a lightning current discharge of say 10,000 amperes, limit the voltage to a level which is only about 10% higher than the present protective level of the best arresters using the silicon carbide valve elements. In other words, the use of zinc oxide varistor material allows one to make a voltage surge arrester which has no spark gaps whatsoever and which can provide protection to within 10% of that provided by modern conventional arresters employing silicon carbide varistors.

In order to provide protective characteristics at least equal to or better than present day arresters it is necessary to consider bypassing (or removing from the discharge circuit) some 10% or more of the total varistor material during the higher current over-voltage discharges such as for example those caused by high-current lightning discharges. This can be done by providing shunt gaps in parallel with about 10% of the series-connected zinc oxide varistor elements and by causing these shunt gaps to spark over when the arrester discharge current reaches a level of some few hundreds of amperes during operation from an overvoltage condition.

The use of zinc oxide varistors and parallel shunt spark gaps is disclosed in U.S. patent application Ser. No. 805,737 filed June 13, 1977, now abandoned, and Swedish Pat. No. 7209436-0 filed Aug. 18, 1972. The description of low-exponent varistors having parallel spark gaps is described in U.S. Pat. No. 3,320,482 issued May 16, 1967. Said U.S. and Swedish patents and said U.S. patent application are incorporated herein by way of reference.

It is desirable that the arrester voltage level at which the shunt gaps sparkover be very accurately controlled. That is, it is imperative that they spark over before the arrester voltage reaches a level which exceeds the designed protective level. They should not spark over until absolutely necessary in order that the arrester is better able to withstand sustained system overvoltages above the normal level, but below the protective level, without damage.

The purpose of this invention is to provide an arrester containing high-exponent zinc oxide varistors and shunt gaps paralleling some portion of the zinc oxide varistors wherein the shunt gap sparkover voltage breakdown characteristics are accurately determined.

SUMMARY OF THE INVENTION

The invention comprises a lightning arrester assembly containing a first plurality of high-exponent zinc oxide varistors connected in series with a second plurality of high-exponent zinc oxide varistors. The second plurality of varistors also includes at least one spark gap for shunting the second varistors during the overvoltage condition and further contains at least one additional varistor having a predetermined lower-exponent value for accurately setting the arrester voltage at which the gap sparks over.

BRIEF DESCRIPTION OF THE PRIOR ART

Figure 1:
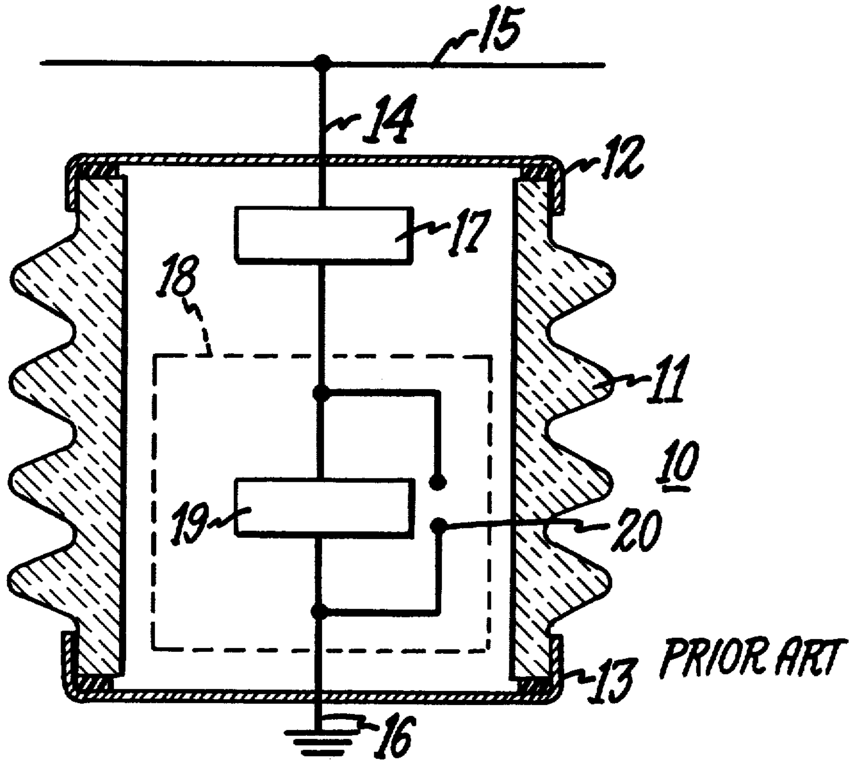
FIG. 1 is a schematic representation of one voltage surge arrester according to the prior art.

A prior art voltage arrester can be seen by referring to FIG. 1 wherein the arrester 10 consists of a porcelain housing 11 having an upper end terminal cap 12 and a lower end terminal cap 13. The arrester 10 further contains within housing 11 a main valve block 17 generally consisting of a plurality of zinc oxide varistor discs electrically connected in series. Also contained within housing 11 is a shunted valve unit 18 which generally consists of a further plurality of zinc oxide varistor discs 19 electrically connected in series and having a simple spark gap 20 connected electrically in parallel. The arrester 10 is electrically connected to power line 15 by means of upper end terminal cap 12 and lead 14. Electrical connection is made to ground by means of lower end terminal cap 13 and lead 16. Since both the main valve block 17 and the shunted valve block 19 are continuously connected between the power line 15 and ground, a small amount of varistor current continuously flows through both the main valve and shunted valve blocks 17 and 19 respectively. The high-exponent of the zinc oxide varistors insures that a current in the order of only a few milliamperes will continuously flow through the main valve block 17 and the shunted valve block 19 to ground. During a condition of overvoltage occurring on power line 15, the voltage to ground occurring across arrester 10 causes the zinc oxide elements within blocks 17 and 19 to become more conductive. Since the equipment to be protected by the arrester 10 is electrically coupled in parallel therewith, the same overvoltage condition occurs across the protected equipment. The purpose of the arrester 10, therefore, is to divert large surge currents occurring during the condition of severe overvoltage through the arrester 10 to ground to prevent equipment failure by limiting the voltage to which the equipment is subjected. This is accomplished in the following manner.

Upon the occurrence of an overvoltage existing across arrester 10, a rapid and substantial increase in current through the arrester occurs in accordance with the previously discussed relationship $I=CV^n$. The voltage across block 19 rises in direct proportion to the rise in voltage across the total arrester 10 because the shunted valve block 19 and series valve block 17 have the same characteristics exponent n. The simple gap 20 is adjusted such that when a predetermined voltage, equal to the designed arrester protective level, appears across arrester 10 the gap 20 ionizes and the parallel voltage existing across both block 19 and gap 20 collapses upon the occurrence of an arc across gap 20. The reduction in voltage across arrester 10 rapidly decreases the magnitude of voltage occurring across the protected equipment and prevents the breakdown of the dielectric materials therein under high voltage stress.

For the circuit of FIG. 1 the voltage across the shunted valve block 19 is always a direct proportion of the voltage across arrester 10. Any variation in the sparkover voltage of gap 20 causes a directly proportional variation in the total arrester voltage at which that sparkover occurs. Because of the undesirable uncertainty in the arrester voltage at which shunt gap sparkover will occur, some auxiliary circuit means of attaining more constant sparkover characteristics is necessary.

Figure 2:
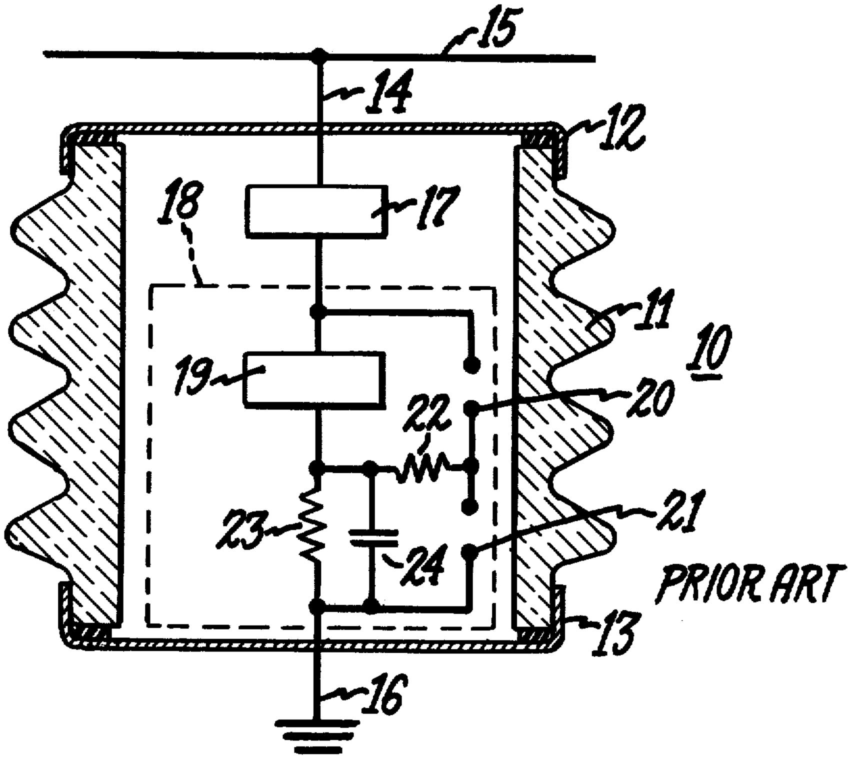
FIG. 2 is a schematic representation of a further voltage arrester according to the prior art.

One means for providing more accurate sparkover conditions can be seen by referring to FIG. 2. The arrester 10 is similar to that of FIG. 1 and like reference numerals are employed to designate similar elements. The auxiliary valve unit 18 includes an additional spark gap 21 which is the control gap, a coupling resistor 22, a linear resistor 23, and a grading capacitor 24. The grading capacitor 24 is connected in parallel across the linear voltage resistor 23 and the coupling resistor 22 is connected from one side of each of the shunt gaps 20, 21 to between voltage resistor 23 and shunted valve 19.

Upon the occurrence of a voltage surge across the arrester 10 the control gap 21 will sense the voltage across the voltage resistor 23 through the coupling resistor 22 and will have its spacing set for sparking over at some predetermined sparkover voltage. Once sparking occurs across control gap 21, shunt gap 20 will also sparkover since it will become suddenly overvoltaged by the added voltage across the coupling resistor 22 after sparkover of the control gap 21. Both the voltage resistor 23 and shunted valve 19 are thereby shunted out of the circuit while the high-current portion of the surge passes through arrester 10. The function of coupling resistor 22, voltage resistor 23 and grading capacitor 24 are described in the aforementioned U.S. Patent Application as follows:

The resistance of the voltage resistor 23 is chosen such that the voltage across it will be approximately the same as it is across the shunted valve 19 at the time that the arrester voltage is nearing the protective level and it is desired to shunt out shunted valve 19 and the series voltage resistor 23. The grading capacitor 24 is chosen to have a capacitance about equal to that of the shunted valve 19 to insure equal voltage division between the voltage resistor 23 and the shunted valve 19 for quickly changing applied voltages. The advantage of this arrangement is that since the main valve 17 and the shunted valve 19 are highly nonlinear and the voltage resistor 23 is essentially linear, the voltage across the voltage resistor 23 and consequently the control gap 21 will increase much more rapidly, relatively speaking than does the voltage across the whole arrester 10. Thus, even if the control shunt gap 21 is somewhat erratic or inaccurate in its sparkover value, it will nevertheless very accurately control the shunting of the shunted valve 19 and voltage resistor 23 as a function of the total arrester voltage. In other words, the voltage resistor 23 provides a "leverage" which permits the control shunt gap 21 to control the shunting as a very accurate function of the total arrester voltage.

One disadvantage of the prior art circuit of FIG. 2 is that it is complex, requiring two shunt gaps for each shunt valve element 19 and also requiring a linear resistor 23 of relatively high current carrying capacity which is difficult to achieve. The circuit of the present invention is less complex and utilizes a readily available silicon carbide varistor in a similar application. The invention further utilizes two shunt gaps to parallel a pair of shunt valve elements 19 rather than the single shunt gap element of the prior art.

DESCRIPTION OF THE PREFERRED EMBODIMENT

Figure 3:
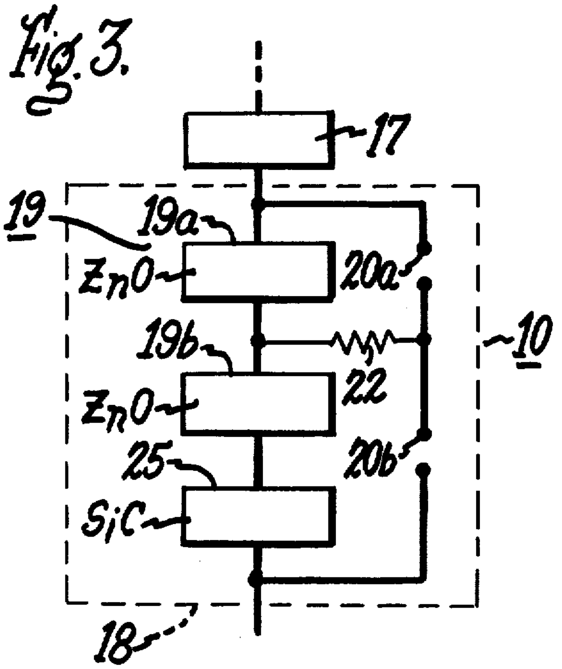
FIG. 3 is a schematic representation of a voltage arrester according to the invention.
Figure 5:
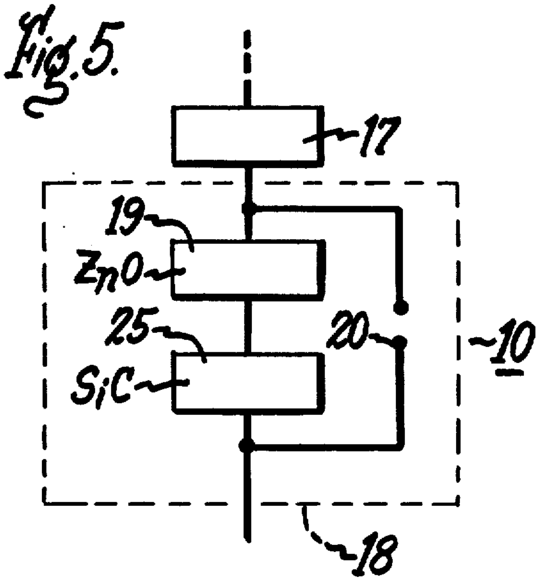
FIG. 5 is a schematic representation of an alternate embodiment of the voltage arrester according to the invention.
Figure 6:
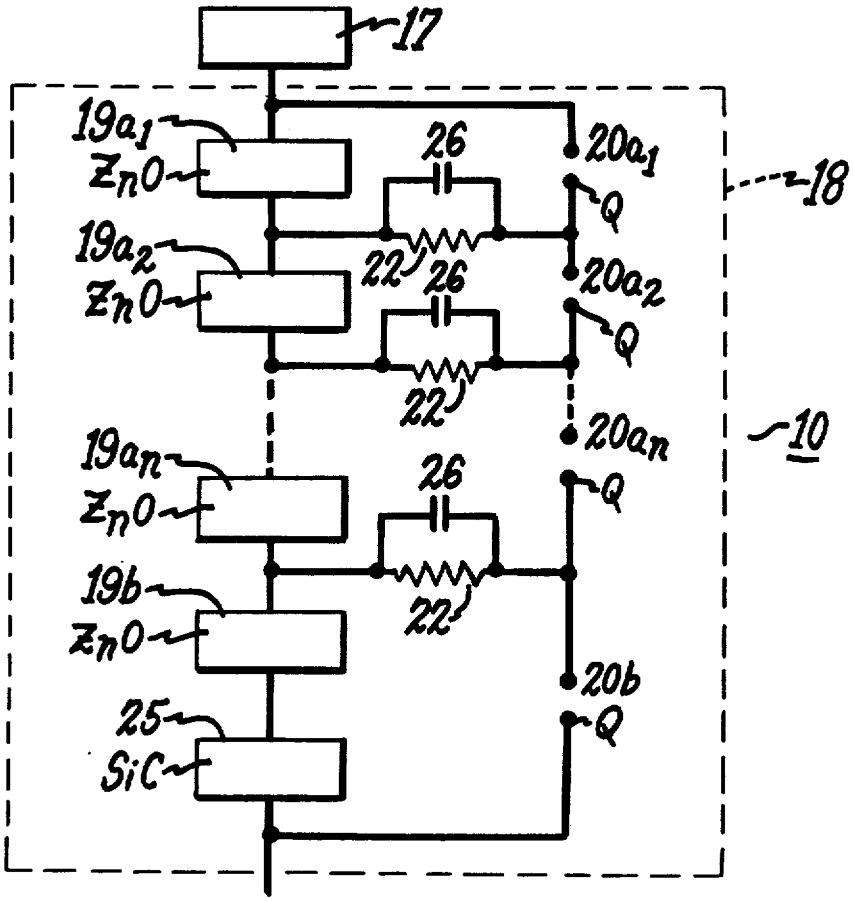
FIG. 6 is a further embodiment of the arrester of FIG. 5.

The arrester configuration according to the invention as shown in FIGS. 3, 5, and 6, is similar to that of FIGS. 1 and 2 in that a main valve block 17 is electrically connected in series with a shunted valve unit 18. The shunted valve unit 18 of the embodiment of FIG. 3 contains a plurality of zinc oxide varistor discs, *19a*, *19b*, and one silicon carbide (SiC) disc 25 for every two zinc oxide discs employed. Each shunted valve block 19 has a corresponding simple gap 20 for providing the same sparkover purpose as the prior art embodiments of FIGS. 1 and 2. The operation of the shunted valve unit 18 is as follows.

As the voltage across the total arrester 10 rises, the current rises at a more rapid rate than the voltage in accordance with the previously discussed relationship $I=CV^n$. Because of this disproportionately rapid rise in current, and because the SiC varistor disc 25 has a much lower exponent ($n \approx 4$–$5$) than the ZnO discs 17 and 19 ($n \approx 25$) the voltage across the combination of ZnO disc *19b*, SiC disc 25, and trigger gap *20b* rises at a much faster rate than the voltage rise occurring across the arrester 10.

The combination of the zinc oxide and the SiC varistor discs within shunted valve unit 18 provides a "leverage" similar to that provided by the prior art configuration of FIG. 2. The "leverage" permits the trigger gap *20b* to control the shunting as a very accurate function of the total arrester voltage.

Figure 4:
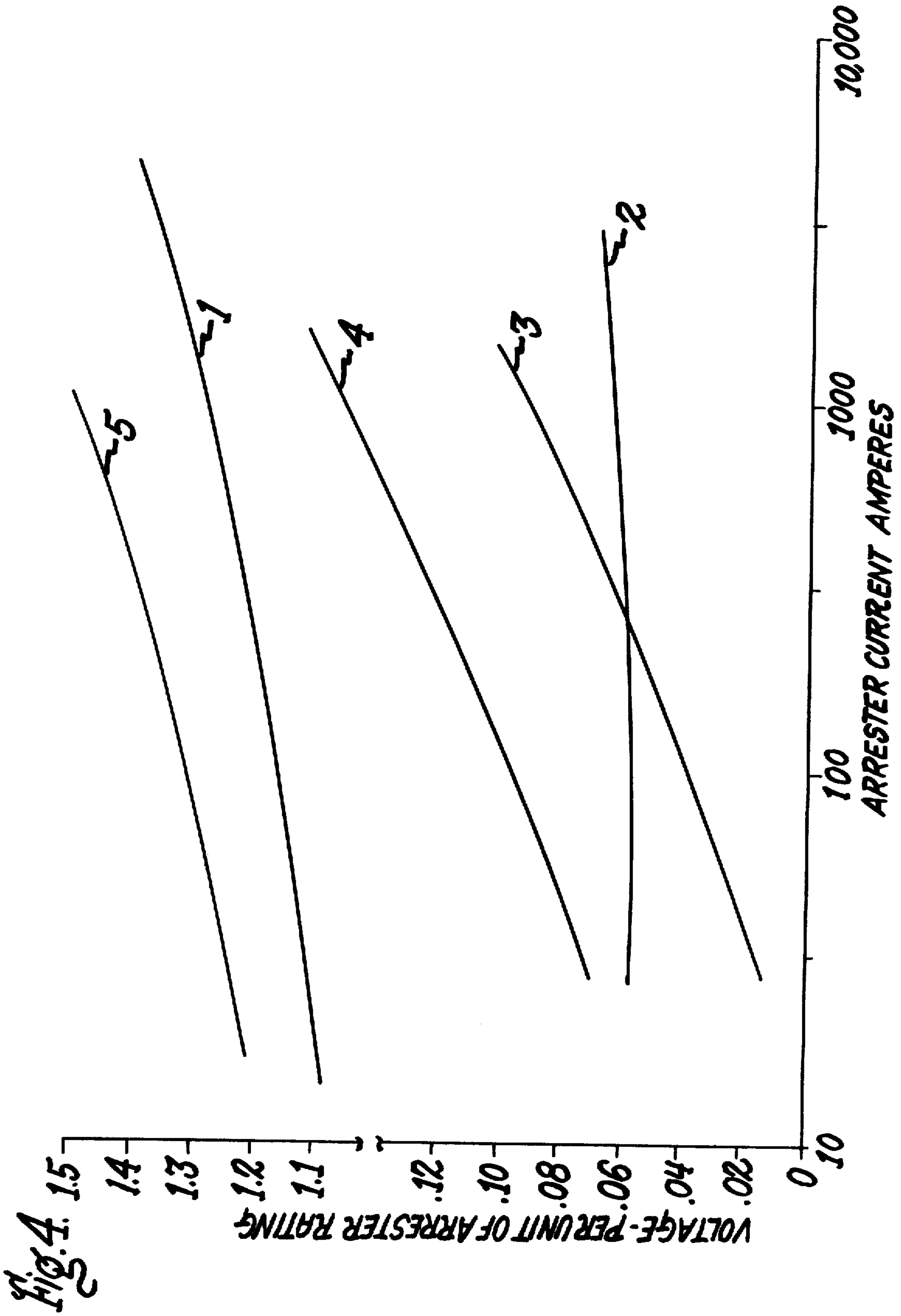
FIG. 4 is a graphic representation of the relationship between varistor current and voltage.

After the trigger gap *20b* has sparked over shunt gap *20a* also sparks over since the gap voltage rapidly rises to its sparkover value by virtue of the now increased voltage across the coupling resistor 22. To further explain the beneficial operation of the embodiment of FIG. 3 the controlled voltage-current characteristics of the components therein are shown in FIG. 4. The volt-ampere characteristic 1 of the high-exponent series valve block 17 of FIG. 3 is designed with the criticality that the voltage of the arrester 10 is set equal to the arrester protective level while discharging a surge current of several thousands of amperes due, for example, to a lightning stroke.

As discussed earlier, to insure adequate stability at the continuous operating voltage, it is necessary to use a number of additional high-exponent discs in the amount of about 10% of those represented by characteristic 1 of FIG. 4. These additional discs must be shunted out of the circuit at an appropriate current level which will be discussed below in greater detail.

FIG. 3 contains two additional discs, 19*a* and 19*b*, which add equally to provide the required additional 10%. Voltage-current characteristic 2 of FIG. 4 which represents the characteristic of one of the additional discs 19*a*, 19*b* which at any particular current equals 5% of the voltage represented by the characteristic 1 of main block 17. Voltage-current characteristic 3 defines the silicon carbide varistor 25 of FIG. 3, selected to have voltage equal to either of the additional discs 19*a*, 19*b* at a current corresponding to 300 amperes. The particular voltage-current characteristic 3 of the silicon carbide disc 25 for the embodiment of FIGS. 3 and 4 is selected for one particular arrester design and may vary in accordance with any particular design.

The trigger gap 20*b* of FIG. 3 is electrically connected across additional disc 19*b* and SiC disc 25 in series and the voltage across trigger gap 20*b* is represented by the voltage-current characteristic 4 of FIG. 4. This voltage-current characteristic 4 is the summation of both voltage-current characteristics 3 and 2 at each represented current level. The volt-ampere characteristic 5 of the total arrester 10 is the summation of the voltage-current characteristics 1, 2, and 4 which correspond respectively to discs 17, 19*a*, 19*b* and 25. In order for the arrester 10 to exhibit a protective level of 1.39 times its rating during the discharge occurring due to a switching surge, the voltage-current characteristic 5 of FIG. 4 indicates that this level is reached at an arrester current of 300 amperes. Therefore, in order not to exceed the protective level of 1.39 times the arrester rating it is necessary that the trigger gap 20*b* and shunt gap 20*a* must spark over as soon as the arrester current approaches 300 amperes. When the arrester current reaches 300 amperes the voltage across trigger gap 20*b* is 0.121 times the arrester rating as indicated by the voltage-ampere characteristic 4 and the voltage across gap 20*a* is 0.06 times arrester rating as shown by the voltage-ampere characteristic 2. Gap 20*b* must, therefore, be adjusted for a maximum sparkover voltage equivalent to 0.121 times the arrester rating. Shunt gap 20*a* may be adjusted to the same sparkover level because once the trigger gap 20*b* sparks over shunt gap 20*a* is subjected to a voltage of about 0.181 times the arrester rating which is adequate to cause shunt gap 20*a* to immediately spark over following the sparkover of trigger gap 20*b*. After both gaps 20*a* and 20*b* have sparked over, discs 19*a*, 19*b* and 25 become short circuited by the negligible voltage drop across the gaps after sparkover and the arrester voltage-current characteristic 5 drops down to the voltage-current characteristic 1 of the main shunt block 17 at the 300 ampere level for the particular example shown.

For the example shown above, trigger gap 20*b* must be adjusted for a maximum sparkover level equivalent to 0.121 times the arrester rating which corresponds to an arrester current of 300 amperes and a total arrester voltage of 1.39 times the arrester rating. If trigger gap 20*b* is given a sparkover tolerance of 10%, the minimum sparkover voltage will be 0.110 times the arrester rating. Voltage-current characteristic 4 shows that this will occur at an arrester current of 185 amperes and, as can be seen from voltage-current characteristic 5, the total arrester voltage is 1.35 times the arrester rating. For a deviation of 10% in the sparkover level for the trigger gap 20*b*, therefore, the deviation in total arrester voltage at which sparkover occurs is only 3%. The "leverage" obtained by using the SiC disc 25 in series with the ZnO disc 19*b* is approximately 3 to 1. The degree of "leverage" obtained is found to be related to the effective nonlinearity of the discs 19*b* and 25 shown connected across trigger gap 20*b* of the embodiment of FIG. 3. Since the degree of nonlinearity of a varistor disc is related to the exponent n a series of curves were developed to determine the effect of exponent n on sparkover response. Replacing the ZnO and SiC discs, 19*a*, 19*b* and 25 with a linear resistor 23 ($n=1$) as shown in the prior art embodiment of FIG. 2, a 10% variation in shunt gap sparkover resulted in gap sparkover over a range of about 0.5% in arrester voltage. For the ZnO discs 17 and 19 of FIG. 1 ($n \approx 25$) a 10% variation in shunt gap sparkover resulted in gap sparkover over a range of 10% in arrester voltage. The embodiments of FIGS. 3, 5, and 6, employing both ZnO ($n \approx 25$) and SiC ($n \approx 4.5$) discs provides a functionally efficient and effective arrester as described earlier. A further embodiment of the invention for arresters of relatively low-voltage rating wherein the number of additional ZnO discs to be shunted is limited, is shown in FIG. 5. A single shunted ZnO disc 19 and SiC disc 25 are shunted by gap 20 which provides trigger gap and shunt gap capability. The function of ZnO disc 19 and SiC disc 25 is equivalent to that of discs 19*b*, 25, and trigger gap 20*b* for the embodiment of FIG. 3.

The voltage rating of an arrester determines the number of discs required to provide the sufficient varistor stability. For an arrester of relatively high voltage rating the number of ZnO discs to be shunted, therefore, may be quite large. Generally more than one shunt unit 18 is required within the high-voltage arrester. Six ZnO discs 19, for example, require three shunt units 18. Three trigger gaps 20*b* are also required so that a degree of redundancy in shunt gap sparkover is provided. FIG. 4 shows that the first of a multiplicity of shunt units 18 can be taken out of the arrester 10 at the 300 ampere protection level as desired earlier. The removal of a first shunt unit 18 reduces the arrester voltage to such an extent that the remaining shunt units 18 do not necessarily spark over until the arrester current exceeds 300 amperes by a prescribed amount. That is, an arrester 10 with a multiplicity of shunt units 18 provides a built-in safety factor whereby one of the trigger gaps 20*b* must sparkover at the predetermined level and the sparkover level of the remaining gaps 20 can exceed this level to some extent. An alternate embodiment to the use of the multiplicity of shunt units 18 of FIG. 3 is shown in FIG. 6 wherein a single trigger gap 20*b* triggers the remaining shunt gaps ($20a_1$–$20a_n$) in a cascading manner. However, since only one trigger gap 20*b* is employed, the redundancy provided by the use of multiple gaps 20*b* of FIG. 3 is not realized.

In the embodiment of FIG. 6 the elements 19*b*, 25, and 20*b*, provide the same function as elements 19*b*, 25, and 20*b* of the embodiment of FIG. 3. Elements $19a_1$, $20a_1$, $19a_2$, $20a_2$, also correspond to elements 19*a* and 20*a* of the embodiment of FIG. 3. For the large voltage rating arrester 10 of FIG. 6 a plurality of capacitors 26 are connected across the coupling resistors 22 so that when trigger gap 20*b* sparks over the remaining gaps ($20a_1$–$20a_n$) become overvoltaged and spark over one at a time, in a cascading fashion. This occurs since each capacitor 26 acts in concert with the inherent capacitance of the ZnO disks ($19a_1$–$19a_n$) to fix the voltage at the lower electrode Q of each gap ($20a_1$–$20a_n$) until each succeeding gap sparks over. The advantage of the embodiment of FIG. 6 over a multiplicity of the embodiments of FIG. 3 is in the efficient use of one SiC disc 25 for any number of shunted ZnO discs $19a_1$–$19a_n$. This results in a substantial reduction in space in a high-voltage arrester.

In the embodiments of FIGS. 3, 5, and 6, the discrete SiC disc 25 is used in effect to reduce the exponent of the ZnO disc 19 shunted by the trigger gap 20*b*. The same overall effect can be obtained if the exponent of the ZnO disc itself is reduced within the operating current range. It is well known in the art that doping of the basic ZnO material in a ZnO varistor with small amounts of lithium causes an increase in grain resistivity which effectively reduces the exponent n at high-current levels without effecting the low-current characteristics. A properly doped ZnO varistor can, therefore, be used to replace the combination of a ZnO disc and a SiC disc according to the invention.

Other materials can also be used to decrease the effective exponent n providing the doped zinc oxide exponent is less than the undoped zinc oxide exponent. A ratio of exponent values of from at least 2 to 1 is operable for the purpose of the invention. The high exponent material n must be greater than 10 and the low-exponent material n must be greater than 1 and less than 10.

It is to be noted that low-exponent SiC material has been used in voltage arrester applications prior to this invention. However, when SiC discs are used a series gap is required as is well known in the lightning protection industry to prevent current flow through the low-exponent material during normal system operation.

Although the overvoltage arrester of the invention is described for electrical equipment protection application purposes, this is by way of example only. The arrester of this invention can also serve to protect any installation against undesirable electrical conditions such as lightning-induced voltages.

We claim:

1. An overvoltage surge arrester comprising:

at least one high-exponent varistor having an exponent greater than 10 for electrical connection between a voltage line and ground;

at least one low-exponent varistor having an exponent less than 10 in series with said high-exponent varistor for providing a more rapid voltage increase than for the high-exponent varistor; and at least one shunt gap shunting said low-exponent varistor and a portion of said high-exponent varistor for reducing the arrester voltage during a condition of electrical overvoltage.

2. The overvoltage surge arrester in claim 1 including at least one further high exponent varistor in series with said low exponent varistor for increasing said varistor voltage rating.

3. The overvoltage surge arrester of claim 2 wherein the ratio of the exponent of the high exponent varistor to the exponent of the low exponent varistor comprises at least 2 to 1.

4. The voltage arrester of claim 1 wherein the high exponent varistor comprises zinc oxide and the low exponent varistor comprises silicon carbide.

5. The voltage surge arrester of claim 1 wherein the high exponent material comprises zinc oxide and the low exponent material comprises zinc oxide doped with an exponent modifying additive.

6. An electrical overvoltage surge arrester comprising:

at least one first varistor having a first exponent for electrical coupling between a voltage line and ground for causing surge current to flow from said line to ground upon the condition of a voltage surge;

at least one second varistor having a second exponent and electrically connected in series with said first varistor, the exponent of said second varistor being lower than the exponent of said first varistor for causing a faster voltage increase across said second varistor; and at least one shunt gap having a predetermined spark-over voltage across said first and second varistors for shunting current from said first and second varistors when said predetermined voltage appears across said shunt gap.

7. The voltage surge arrester of claim 6 wherein the predetermined shunt gap voltage occurs within a surge current range from 10 to 1000 amperes.

8. The voltage surge arrester of claim 6 wherein the predetermined shunt gap voltage comprises at least 5% of the arrester voltage.

9. The voltage surge arrester of claim 6 wherein the exponent of the first varistor is at least two times larger than the exponent of the second varistor.

* * * * *